J. B. PEAKE.
Device or Clamp for Stopping Leaks in Water and Other Pipes.

No. 164,028.          Patented June 1, 1875.

WITNESSES:
P. C. Dieterich
H. C. McArthur

INVENTOR:
James B. Peake
per
C. H. Watson & Co
ATTORNEYS.

THE GRAPHIC CO.PHOTO-LITH.39 & 41 PARK PLACE, N.Y.

UNITED STATES PATENT OFFICE.

JAMES B. PEAKE, OF WASHINGTON, DISTRICT OF COLUMBIA, ASSIGNOR TO HIMSELF AND WALTON BROTHERS, OF NEW YORK CITY.

IMPROVEMENT IN DEVICES OR CLAMPS FOR STOPPING LEAKS IN WATER AND OTHER PIPES.

Specification forming part of Letters Patent No. 164,028, dated June 1, 1875; application filed April 5, 1875.

*To all whom it may concern:*

Be it known that I, JAMES B. PEAKE, of the city of Washington and District of Columbia, have invented certain new and useful Improvements in Pipe-Leak Fasteners; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of a device or clamp for stopping leaks in water, gas, or other pipes, and also for connecting two sections of pipe together, as will be hereinafter more fully set forth.

Figure 1:
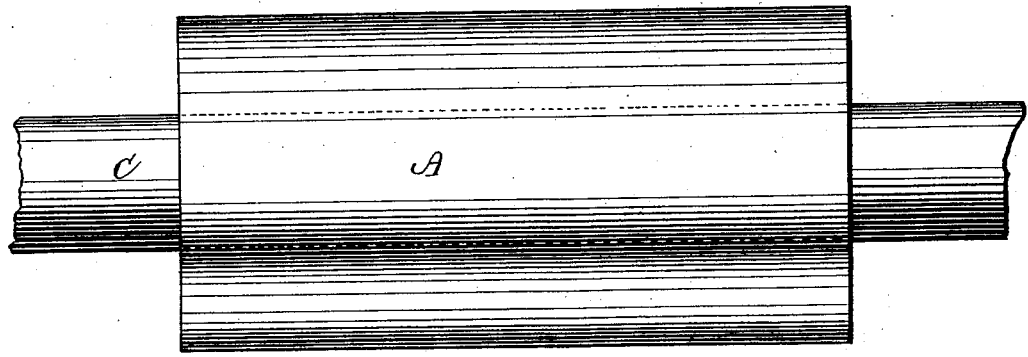
Figure 2:
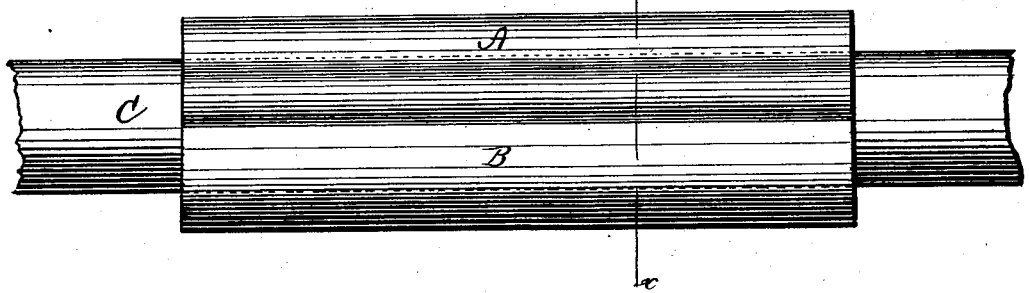
Figure 3:
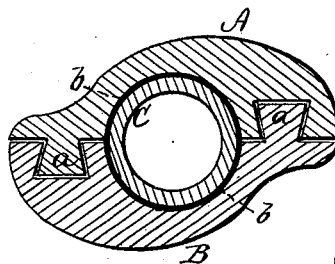

In the annexed drawing, Figure 1 is a plan view, and Fig. 2 a side view, of my clamp. Fig. 3 is a transverse vertical section of the same through the line $x\ x$, Fig. 2.

My clamp is made of metal, in two equal parts, A and B, constructed substantially in the form shown in Fig. 3, each having a longitudinal semicircular groove, so as to fit over the pipe C, for which it is intended. Each part of the clamp is formed with a longitudinal tapering dovetailed flange or rib, $a$, which fits in a correspondingly-shaped groove on the other part, one of said joints being on each side of the pipe when the clamp is put on.

A pipe, either for water, gas, steam, or other purpose, having become bursted, packing $b$ of sheet-lead or other suitable material is placed over and around the pipe at that point. The clamps A B are then forced together, by suitable mechanical means, over the bursted section of pipe and packing until the ends of the clamps are parallel to each other, thereby making the pipe perfectly tight and stopping the leak.

The clamps cannot become detached or separated except by using extraordinary means for that purpose.

The same device may be used for coupling two sections of pipe together.

Having thus fully described my invention, what I claim as new, and desire to secure by Letters Patent, is—

1. The clamps A and B, provided with tapering dovetailed flanges or ribs $a\ a$, and with correspondingly-shaped grooves, substantially as and for the purposes herein set forth.

2. The combination, with a pipe, C, of the packing $b$ and the clamps A B, having tapering dovetailed joints, substantially as and for the purposes herein set forth.

In testimony that I claim the foregoing as my own I affix my signature in the presence of two witnesses.

JAMES B. PEAKE.

Witnesses:
 H. C. SCOTT,
 P. C. DIETERICH.